United States Patent [19]

Chhuy et al.

[11] 4,081,565

[45] * Mar. 28, 1978

[54] EDIBLE COMPOSITIONS HAVING A MEAT FLAVOR AND PROCESSES FOR MAKING SAME

[75] Inventors: Lim Chheang Chhuy, Bougival, France; Edgar Allen Day, deceased, late of Rumson, N.J., by Esther Virginia Day, executrix

[73] Assignee: International Flavors & Fragrances Inc., New York, N.Y.

[*] Notice: The portion of the term of this patent subsequent to Jul. 23, 1985, has been disclaimed.

[21] Appl. No.: 451,469

[22] Filed: Mar. 15, 1974

Related U.S. Application Data

[63] Continuation-in-part of Ser. No. 342,360, Mar. 19, 1973, abandoned.

[51] Int. Cl.² .................................................. A23L 1/227
[52] U.S. Cl. .................................... 426/533; 426/56; 426/656
[58] Field of Search ............... 426/65, 175, 212, 221, 426/222, 364, 533, 56, 656

[56] References Cited

U.S. PATENT DOCUMENTS

| | | | |
|---|---|---|---|
| 2,934,437 | 4/1960 | Morton et al. | 426/65 |
| 3,394,015 | 7/1968 | Giacino | 426/65 |

*Primary Examiner*—Raymond N. Jones
*Assistant Examiner*—Esther M. Kepplinger
*Attorney, Agent, or Firm*—Arthur L. Liberman; Franklin D. Wolffe; Harold Haidt

[57] ABSTRACT

Processes for imparting a meat flavor to foodstuffs comprising adding thereto a small amount of a processed product of (I) a meat enzymatic digest and, in addition, (II) a sulfur compound such as cysteine or taurine and, if desired, (preferably) (III) thiamine and/or thiazole alkanols and (IV) other free amino acids and/or polypeptides and, in addition, if desired, (V) a monosaccharide and/or a disaccharide, such as sucrose and/or a polysaccharide the product being processed in the absence of any egg (e.g., chicken egg) components; as well as flavoring compositions and flavor enhancing compositions containing such processed products and optional materials and the foodstuffs so obtained.

1 Claim, No Drawings

EDIBLE COMPOSITIONS HAVING A MEAT FLAVOR AND PROCESSES FOR MAKING SAME

This application is a continuation-in-part of U.S. patent application Ser. No. 342,360 filed on Mar. 19, 1973, now abandoned.

BACKGROUND OF THE INVENTION

This invention relates to flavoring foodstuffs, to compositions for flavoring foodstuffs, and to the products so obtained.

Much attention has been devoted to improving the flavor of foodstuffs and particularly the flavors of meat products, fruits and confectioneries. There is also a need to provide compositions and processes for improving the flavors of meat products such as patties containing beef, lamb, chicken, duck or turkey meat, of for providing savory meat or poultry flavors to foods containing a low level of meat products originally having only a low level of flavor.

A substantial number of investigations have been carried out relating to reacting such materials as amino acids, hydrolyzed vegetable proteins, sugars, sulfur-containing compounds (e.g., cysteine and hydrogen sulfide) and ribonucleotides in an effort to produce meaty tasting products including poultry meat tasting products, or ingredients therefor. Thus, for example, the following publications set forth such reaction products and methods for preparing same.

| Publication | Reactants |
| --- | --- |
| (1) U.S. Pat. 3,394,017 | Poultry meat flavor produced by reacting thiamine and a mixture of amino acids. |
| (2) U.S. Pat. 3,519,437 | Poultry flavor produced by reacting thiamine and 2-amino-ethane sulfonic acid. |
| (3) U.S. Pat. 3,532,514 | Cysteine, sugar, fatty acid material. |
| (4) Belgian Pat. 740,221 | Reducing sugar and fish product extract. |
| (5) U.S. Pat. 3,645,753 | Enzymatic digest of meat extract hydrolyzed vegetable protein and yeast autolysate. |
| (6) U.S. Pat. 3,394,015 | Sulfur-containing compound and hydrolyzed vegetable protein (sugar-free). |
| (7) U.S. Pat. 3,394,016 | Thiamine and an aliphatic carboxylic acid. |
| (8) German Offen. 1,932,800 | Hydrogen sulfide and a 4-hydroxy-2,3,-dihydrofuran-3-one. |
| (9) U.S. Pat. 2,918,376 | Fish protein hydrolyzate and cysteine. |
| (10) U.S. Pat. 2,887,387 | Fish protein hydrolyzate and saccharide. |

However, none of the foregoing references, disclosing processed food flavoring materials, discloses the production of a natural meat-flavored material from reactants containing no egg product and having low protein levels and wherein one of the reactants is a meat enzymatic digest and another of the key reactants is a sulfur-containing compound. Although the above-mentioned U.S. Pat. No. 3,645,753 describes reaction products wherein one reactant is an enzymatic digest of meat extract, and another reactant is a mixture of amino acids, e.g., hydrolyzed vegetable protein, the reaction product disclosed does not have the full bodied meaty flavor with the substantially authentic mouthfeel of the flavors of this invention, and no sulfur-containing compound is set forth as one of the reactants. In addition, thiamine or a salt thereof or a precursor thereof is not included as one of the reactants.

The reaction product of cysteine and a hydrolyzed vegetable protein of U.S. Pat. No. 3,394,015 is different in kind from a reaction product produced under conditions disclosed in U.S. Pat. No. 3,394,015 except that the hydrolyzed vegetable protein is replaced with an enzymatic meat digest.

Copending U.S. patent applications Ser. No. 304,805 now U.S. Pat. No. 3,865,958 and Ser. No. 304,806 now U.S. Pat. No. 3,862,343 filed on Nov. 8, 1972 disclose a reaction product wherein all of the above-mentioned reactants are used to form such a reaction product except that meat enzymatic digest is not disclosed as one of the reactants and egg products are not omitted as reactants. The inclusion of egg products and the omission of enzymatic meat digest in the said earlier-filed copending patent applications gives rise to reaction products which are different in kind from those which represent our invention as set forth herein.

Copending U.S. patent application Ser. No. 334,894 filed Feb. 22, 1973 discloses a meat-flavored product produced by means of a heat reaction of (i) an egg product (e.g., egg yolk) which may or may not be enzymatically digested (ii) a meat product which may or may not be enzymatically digested and (iii) a sulfur compound such as cystine. The inclusion of an egg product in the said earlier filed copending patent application gives rise to reaction products which are different in kind from those which represent our invention as set forth herein. Furthermore, from a mammalian physiological point of view, the inclusion of an egg product (notwithstanding) its flavor augmenting potential or the differences in flavor nuances caused by its presence in the reaction mass) may in several instances be physiologically detrimental where the individual mammal ingesting the flavor is allergic to one or more of the chemical components of the egg.

THE INVENTION

This invention relates to novel meat (including poultry meat) flavoring compositions and to processes for preparing them.

The term "meat" in this disclosure is intended to include such edible animal protein as various types of beef, veal, pork, lamb, chicken, turkey, and duck meat. Thus, the term "meat-like" is intended herein to not only include "beef-like" but also "poultry meat like."

Food products enhanced with meat-like (including poultry meat-like) flavorings are well known and have long been used. There is considerable demand for meat flavored and poultry flavored products wherein there is little if any actual beef, veal, pork, lamb or poultry meat and where larger quantities of such meats are either unnecessary or are actually undesirable. Thus, for example, in the preparation of sauces, gravies and purees the beef, veal, pork, lamb or poultry flavor is desired, but it is necessary to cook with the desired meat and then remove said meat by straining or using some similar operation to obtain the final product ready for use.

Additionally, where weight, space and/or storage capacity are problems, e.g., when a convenience food is prepared, the presence of relatively large quantities of the actual meat may be undesirable because of deterioration problems in storage. Moreover, there are occasions when sterilizing or otherwise preserving relatively larger concentrations of the natural product is extremely deleterious to the flavor of the natural materials and the desired natural flavor is lost.

U.S. Pat. Nos. 3,394,015; 3,394,016; 3,394,017 and 3,519,437 as well as copending applications for U.S. Letters Patent Ser. Nos. 304,805 and 304,806 filed on Nov. 8, 1972 in part, provide solutions to the aforementioned problems by providing methods for the production of poultry and other meat flavors which contain a substantial number of the notes of natural poultry and other meat flavors but which do not contain any actual meat products. However, these several patents and patent applications do not teach techniques for producing highly intensified and controlled meat or poultry flavors having mouthfeel and flavor nuances closely resembling those properties attributable to the actual natural meat and poultry meat flavors. Furthermore, the above-mentioned patents and copending patent applications do not disclose our highly refined technique for reproducibly duplicating a specific desired meat or poultry flavor, (1) without including very substantial quantities of the actual meat, (the flavor of which is desired to be duplicated) in the initial reaction mass, and still (2) providing such highly intensified controlled meat or poultry flavors having mouthfeel and flavor nuances closely duplicating those of the said desired natural flavor. The term "controlled" is intended to mean the determination, in advance, of the specific quality of the flavor desired to be produced, (e.g., "reacted beef", "veal", "pork", "lamb", "duck meat", "white turkey meat", and "chicken meat") by using the appropriate reactants in the proper proportion.

Although the aforementioned publications and patent applications give rise to general meat flavor applications, the high degree of control of quality taken together with the high intensity and an ability to duplicate mouthfeel and substantially all of the flavor nuances of the various meat flavors was not taught therein.

Furthermore, although copending U.S. patent application Ser. No. 334,894 filed Feb. 22, 1973, now abandoned also disclosed processes for producing highly intensified controlled meat flavors having mouthfeel and flavor nuances closely resembling those properties attributable to actual natural meat flavors, the process encompassed by said earlier filed case (i) give rise to meat flavors which are different in kind from those created by the processes of our invention and (ii) require the use of an egg product or enzymatic digest thereof, specifically excluded from the process of our invention.

Accordingly, this invention provides specific reproducibly controlled beef, veal, pork, lamb and poultry flavors as desired, not only insofar as their flavor nuances are concerned but also insofar as the mouthfeel of such flavors are concerned produced without the need for using any egg components.

This invention also provides essentially natural particularly controlled meat flavored products which are suitable for incorporation into a wide range of foodstuffs.

Further and more specific objects, features and advantages will clearly appear from the detailed description below taken in conjunction with the accompanying examples which illustrate certain preferred embodiments of this invention.

In one aspect of this invention, an edible flavor composition is produced by heating in the absence of an egg product a reaction mixture of (i) a meat powder (such as turkey meat powder) enzymatic digest and (ii) a sulfur-containing compound, whereby a reaction product is produced. This heating is carried out for a period of time sufficient to develop a flavor of beef, veal, pork, lamb or poultry in the mixture. Depending on the particular nature of the powdered meat enzymatic digest used, the resulting meaty flavor will be the flavor of the powdered meat used, notwithstanding the fact that it is reacted and used in small quantities.

The edible reaction products produced by the process of our invention are novel meat flavoring materials or bases. Accordingly, edible compositions having enhanced flavor and which comprises a food and the aforesaid reaction product are further contemplated by our invention. In addition, other reactants are used to modify or augment the particular meat flavor without changing, in kind, the resulting specific meat flavor produced. Thus, for example, acid salts of thiamine in the reaction mixture will give rise to a more natural intense meaty flavor but will not bring about a change in the specific nature of the meat flavor produced. Other materials that can be added in addition or in lieu of thiamine are thiazole alkanols (which are, for example, thiamine precursors) such as those described in U.S. Pat. No. 3,681,088 issued on Aug. 1, 1972 and other free amino acids and polypeptides.

Our invention in its broad aspect also involves heating, in the absence of any egg products a mixture which comprises an enzymatic digest of meat and, in addition, a sulfur-containing compound at an elevated temperature for a period of time whereby a specific meat flavor is developed. It is to be noted the pre-mix per se possesses very little of meat characteristics and hence our invention may be regarded as being in the discovery that when a small amount of meat powder enzymatic digest is used, the result will be the imparting of a specific meat flavor nuance to a reaction flavor of this component with a sulfur compound (in the absence of any egg products), as more particularly set forth, infra, and optionally but preferably, thiamine or a thiamine salt or a precursor therefor as defined infra.

The enzymatic digest of meat such as enzymatic digest of turkey meat is produced by admixing said meat, preferably in the form of a powder in aqueous media with an enzyme which has the ability to effect selective cleavage of the peptide bonds located in the molecular structure of the meat protein. The enzymes used in digesting the meat protein are as follows:

(1) Papain
(2) Pilzprotease S (produced by Roehm G.m.b.H., Darmstadt Germany)
(3) Rhozyme P 11 (produced by Rohm & Haas G.m.b.H., Darmstadt Germany)
(4) Bromelin
(5) Pepsin
(6) Trypsin
(7) J-25 (produced by Rohm & Haas Inc. of Philadelphia, Pa.)
(8) Protease 62 (produced by Rohm & Haas Inc. of Philadelphia, Pa.)
(9) HT Proteolytic 200 (produced by Marschall Division of Miles Laboratories, Inc. Elkhart, Ind.)
(10) Fungal Protease (produced by Marschall Division of Miles Laboratories, Inc. Elkhart, Ind.)
(11) Prolase MT-7820 (produced by Wallerstein Laboratories of Martin Grove, Ill.)
(12) Molsin (produced by Seishin Pharmaceuticals Ltd. Noda Shiba, Japan)

(13) Mylase
(14) Bakterien Protease N (produced by Roehm G.m.b.H., Darmstadt (Germany)
(15) Protease enzymes produced according to the processes set forth in German Offen. 2063988, published on July 28, 1972 and assigned to Henkel & Cie GmbH.

Of all of the above mentioned enzymes, the most preferred for digesting meat protein from both a commercial standpoint and organoleptic standpoint for the purpose of this invention are pepsin and mylase.

Furthermore, when producing the enzymatic digest of the above mentioned meat protein material, it is preferred to admix the enzyme with the meat material at a temperature of from 40° up to 75° C in aqueous media for a period of time from 10 hours up to 150 hours. Periods of time greater than 200 hours and/or temperatures higher than 75° C will give rise to a product which is less desirable for the purpose of subsequent reaction with the sulfur-containing compound. On the other hand, temperatures below 40° C and/or times of mixing below 10 hours will give rise to only a partially enzymatically digested meat product which would not give rise to a product having predictable flavor nuances, mouthfeel and texture properties. Furthermore, in producing the above mentioned enzymatic digest, it is important that proper pH adjustments be made on the enzyme-protein material-water mix, prior to incubation. Suitable pH ranges vary from 3 up to 6 and constant pH's are obtainable by using appropriate buffers, e.g. sodium citrate and sodium diacid phosphate of a pH of 4.6.

The term "sulfur-containing compounds" is intended to mean sulfur-containing amino acids which have the ability to liberate hydrogen sulfide when reacted, or lower alkyl mercaptans, or lower alkyl sulfides, or lower alkyl disulfides, or amino alkane sulfonic acids or salts thereof, e.g. the sodium salt of amino ethane sulfonic acid (taurine). The term "sulfur-containing compounds" may also include an inorganic sulfur compound or hydrogen sulfide itself, each of which is adapted to liberate a flavor under heating. Such inorganic sulfur compounds are designated herein as having the formula $MS_x$, wherein M is selected from the group consisting of an alkali metal (e.g. sodium or potassium), an alkaline earth metal (e.g. calcium or magnesium) and ammonium and $S_x$ is selected from the group consisting of sulfide, polysulfide and sulfhydrate.

When hydrogen sulfide or a lower alkyl mercaptan is used, it is necessary to control the amount used so as to avoid over-powering the aroma of the product with the aroma of the mercaptan or the hydrogen sulfide. The lower alkyl mercaptans and sulfides preferably contain from 1 up to 6 carbon atoms. The lower alkyl disulfides preferably contain 1 to 3 carbon atoms. Cysteine and methionine and their acid salts, such as cysteine hydrochloride, are especially preferred sulfur-containing amino acids. Especially preferred products resembling natural flavor and having the natural texture and mouthfeel attributable to such natural flavor are produced by means of first producing a mylase enzymatic digest of powdered chicken meat and then heating a mixture of such enzymatic digest with cysteine hydrochloride in the absence of any egg products.

Cysteine and cystine are sulfur-containing amino acids readily available as free amino acids or as salts, both acid and basic. Preferably, the acid salts, especially the halogen acid salts, such as the hydrochloride, are utilized. The inorganic sulfur-containing compounds mentioned above include sodium sulfhydrate and sodium sulfide. Instead of sodium compounds, corresponding compounds of potassium, calcium and ammonium or substituted ammonium may be used. Any such compound employed must be capable of reacting to give the desired specific natural meat note.

Other organic sulfur-containing compounds useful in the practice of our invention include methyl mercaptan, ethyl mercaptan and propyl mercaptan, dimethyl sulfide, dimethyl disulfide and methyl ethyl sulfide.

The term "sulfur-containing compounds" as used herein is not intended to include thiamine or thiamine precursors or acidic or basic salts of thiamine. Such thiamine salts or precursors of thiamine or thiamine per se are used preferably in addition to the "sulfur-containing compounds" of our invention in the reaction mass.

Additional flavor nuances may be introduced into the reaction product of our invention by incorporating into the reaction mass prior to or during the heat reaction thiazole derivatives, such as, for example, thiamine hydrochloride and/or 4-methyl-5-($\beta$-hydroxyethyl)-thiazole. Instead of using thiamine hydrochloride, the thiamine may be used as a free base; but it is preferably employed as an acid salt and, indeed, the hydrochloride is especially suitable. In addition, free amino acids, such as alanine, leucine, valine, glutamic acid and/or various polypeptides including dipeptides and tripeptides may also be added to the reaction mass prior to or during the heat reaction process. In addition, quantities of nucleotides may be added prior to, during or subsequent to the reaction between the sulfur-containing compound and meat powder enzymatic digest. The preferred nucleotides used in the practice of this invention are mixtures of disodium inosinate and disodium guanylate. In addition, prior to or during the reaction between the sulfur-containing compound and the enzymatic meat digest, a quantity of a saccharide material such as d-xylose, ribose, sucrose, and dextrose may be added in order to modify the resulting meat type flavor.

When producing specific poultry meat flavors, lower alkyl carbonylic materials, such as ketones and alkyl aldehydes can be admixed into the reaction system during or subsequent to the heating step. It is generally preferred to add these materials after heating the reaction mass since they are generally volatile, and losses thereof may occur during the heating. The ketonic materials used in this aspect of the invention are preferably lower alkanones and hydroxy-substituted alkanones containing from about 4 to 8 carbon atoms such as diacetyl, acetyl-methylcarbinol and acetylpropionyl. The alkyl aldehydes are preferably the aldehydes containing from about 5 up to 12 carbon atoms. Especially preferred are n-pentanal, n-hexanal, n-heptanal, 2,4-nonadienal, 2,4-decadienal, and 2,4-undecadienal. Conveniently, these aldehydes and/or ketones are employed at levels ranging from 0.01 up to 0.1 times the weight of the meat powder enzymatic digest used.

The reaction between the sulfur-containing compound and the meat powder enzymatic digest is preferably carried out at reflux conditions (usually over 100° C) at pressures of between 1 and 10 atmospheres for periods of times of from 0.2 up to 10 hours. It is to be emphasized that, generally, temperatures above 400° C make the reaction difficult to control and may well produce uncharacteristic burnt notes even with very short reaction times (e.g. of the order of 10 – 20 minutes). Accordingly, it is preferred to carry out the reaction at temperatures of from 100° up to 350° C; until the desired flavor development is achieved. As stated above, the heating periods may range from about 0.2 hours up to about 10 hours depending upon the heating method used.

Where it is desired, the process can be carried out on a batch basis in small quantities of, for example, 50 to 100 grams or it can be carried out batchwise, semi-continuously, or continuously on much larger quantities of 500 kilograms or more.

In preparing the enzymatic meat digest a preferred ratio of enzyme to meat material (e.g. turkey powder) is from 0.1 up to 1%; preferably from 0.1 up to 0.4%. The weight percent of sulfur-containing compound based on enzymatic meat digest is from 1 up to 20%; preferably between 2 and 5%. Where it is desired to use thiazole derivatives for the purpose of introducing additional flavor nuances into the product of our invention, the weight ratio of thiazole derivatives (e.g. thiamine hydrochloride) to sulfur-containing compounds is between 0.25:1 and 1:1; preferably 0.5:1. Where it is desired to use a saccharide material in the reaction mass in order to introduce still additional flavor nuances into the product of our invention, the weight ratio of saccharide to sulfur-containing compound is between 1:100 and 1:3; preferably 1:6.

It should be noted that the presence of the saccharides in the reaction mass gives rise to a reaction product having somewhat intense sweet meat flavor characteristics (e.g. poultry or sweet pork nuances). Care should be exercised in utilizing such saccharides, however, since they may tend to contribute some burnt notes to the ultimate reaction product. When used, suitable results are obtained at levels ranging up to about 25% by weight based on the total weight of the reaction mass. Preferably the range is from 0.5 to 5 weight percent of the overall reaction mass. This range is further limited by the preferred ratio of saccharide to sulfur-containing compound.

Preferably, but not necessarily, a large weight excess of water or other reaction medium (e.g., beef fat, vegetable fat, chicken fat, duck fat, and fatty acid glycerides, such as "Neobee M-5" produced by the Drew Chemical Division of U.S. Filter Corporation or fish oil or mixtures of such fats and oils with water either in emulsified or non-emulsified forms) is used in preparing the enzymatic meat digest used in practicing our invention, although such excess is not essential. Varying amounts of water or fat or fish oil, for example from about 1:1 up to about 10:1 by weight based on the total weight of the remainder of the enzymatic meat digest can be used. In the case of aqueous mixtures after mixing of the enzymatic meat digest with the sulfur-containing compound and after the subsequent reaction with the sulfur-containing compound the water can be at least partially evaporated to produce a solid or a semi-solid edible composition. When using triglyceride fats, the fatty acids predominantly range in carbon chain length from about 20 carbon atoms up to about 22 carbon atoms. The term "triglyceride fat" will be understood to mean both fats and oils. It is preferred that the triglyceride fats be refined, bleached and deodorized. They can be in their natural form or they can be hydrogenated.

The quantity of reaction product utilized in the practice of our invention when added to a foodstuff can be varied to provide a wide range of meaty flavors. At levels as low as 0.1%, the reaction product begins to impart a very light, almost undefinable sensation in aqueous solution. As the level is increased to 0.2%, a different pleasant meaty like character is imparted to an aqueous solution. As the level reaches 0.5% a definite, good characteristic beef, veal, pork, lamb or poultry meat like flavor and aroma is obtained and this level persists up to levels of 2% and beyond, where the substance leaves a light, lingering after taste. At levels higher than 1% not only is the specific meat flavor indistinguishable from the natural meat flavors but the mouthfeel and texture provided by the reaction product of our invention are substantially identical to those properties provided by the natural meat flavor desired. All parts, proportions, precentages and ratios herein are by weight unless otherwise indicated.

The reaction product of our invention can be added in pure form to foodstuffs or in admixture with other flavors and/or aroma imparting ingredients and/or in admixture with other non-toxic edible solvents (e.g. water, ethanol, wines and liqueurs), thickeners (e.g. starch paste) carriers and extenders (e.g. bread crumbs). The resulting mixtures may be used as such or may be further processed as by heating.

It will be understood by those skilled in the art that regardless of the purity of the reactants used they should contain no noxious or noisome components which would interfere with the flavor conferred on foodstuffs or on its safety for use in edible materials.

It is contemplated herein that foodstuffs flavored according to this invention include both solid and liquid preparations for oral consumption by human beings and by animals particularly warm-blooded domestic animals, such as are used for pets or raised for consumption.

The products of our invention may be provided as dry solids, in liquid mixtures or in pastes. Preferably, they are prepared by heating, in the absence of any egg products such as egg yolk, the meat powder enzymatic digest in conjunction with the sulfur-containing compound wherein at least one of the foregoing materials is admixed with its equal weight of water. The resulting end product may be used as such, or it may be concentrated for use. If solid products are desired, the same may be obtained by drying the liquid mixtures. The aqueous compositions are dehydrated by spray-drying although drum-drying, freeze-drying and other drying procedures are also applicable to the reaction product of our invention. A solid carrier is often added to the liquid mixture before drying.

When carrying out the spray-drying process which is the preferred drying process, we have found that carriers are useful in extending the flavor of our products when so prepared. These carriers do not diminish the quality of the flavor, but they stabilize it and increase the shelf life of the product. Polysaccharides having relatively complex structures such as gum arabic, gum tragacanth, gum karaya and guar gum and mixtures of same are useful, as are cellulose derivatives such as methyl cellulose and carboxy methyl cellulose or partially hydrolyzed starch such as dextrin, and the like.

In a preferred process, an aliquot of the liquid composition is dried and the flavor solids content of the composition determined. An amount of carrier substantially equal to the calculated solids content of the liquid composition is added thereto and the mixture dried, preferably by spray-drying. Alternatively, an amount of carrier substantially equal to the combined weight of the meat enzymatic digest and sulfur-containing compound is added to the liquid composition after reaction of the ingredients and the mass is then dried. The preferred amounts of carrier are from 0.2:1 up to about 2:1 based on the solids content of the liquid mixture.

The following examples illustrate the manner in which we now prefer to practice our invention. It is to be understood that this invention is not to be considered as limited thereto except as indicated in the appended claims. In the examples, the various ingredients are listed in parts be weight.

EXAMPLE I

Into a 300 ml flask equipped with stirrer, thermometer, and heating mantle, the following materials are placed:

50 grams — ground raw turkey meat
100 ml — water
0.20 grams — Mylase enzyme the pH of the contents of the flasks is adjusted to exactly 5.0 by addition thereto of phosphoric acid. The contents of the flask is prepasteurized for 30 minutes at 60° C. The contents of the flask are then incubated at 50° C using agitation (250 RPM) for a period of 120 hours. The resulting enzymatic turkey digest is used in the reaction flavors as set forth in the several examples following.

EXAMPLE II

The procedure of Example I is carried out using the following quantities of turkey meat paste and enzymes except that the pH of each of the mixtures is first adjusted to 4.6 using a buffer which is a one molar solution of sodium citrate and sodium diacid phosphate:

| Quantity of Turkey Powder | Enzyme and Quantity |
|---|---|
| 100 gms. | 0.1 gms. prolase |
| 100 gms. | 0.1 gms. bromelain |
| 100 gms. | 0.1 gms. papain |
| 100 gms. | 0.1 gms. pilzprotease S |
| 75 mgs. | 0.1 gms. rhozyme P 11 |
| 75 gms. | 0.1 gms. bromelin |
| 50 gms. | 0.1 gms. pepsin |
| 50 gms. | 0.1 gms. trypsin |
| 50 gms. | 0.1 gms. J-25 |
| 50 gms. | 0.1 gms. protease 62 |
| 50 gms. | 0.1 gms. HT proteolytic 200 |
| 40 gms. | 0.1 gm.s fungal protease |
| 25 gms. | 0.1 gms. prolase MT-7820 |
| 25 gms. | 0.1 gms. molsin |
| 25 gms. | 0.1 gms. mylase |
| 20 gms. | 0.1 gms. bakterien |
| 20 gms. | 0.1 gms. protease |

Each of the resulting enzymatic turkey meat digests are used, separately, in the reaction flavors as set forth in the several examples following.

EXAMPLE III

Into a 300 ml flask equipped with stirrer, thermometer and heating mantle, the following materials are placed:

50 grams — ground raw chicken meat
100 ml — water
0.10 grams. — Mylase enzyme

The pH of the contents of the flasks is adjusted to exactly 5.0 by addition thereto of phosphoric acid. The contents of the flask is prepasteurized for 30 minutes at 60° C. The contents of the flask are then incubated at 50° C using agitation (250 RPM) for a period of 120 hours. The resulting enzymatic chicken digest is used in the reaction flavors as set forth in the several examples following.

EXAMPLE IV

The procedure of Example III is carried out using the following quantities of chicken meat paste and enzymes except that the pH of each of the mixtures is first adjusted to 4.6 using a buffer which is a one molar solution of sodium citrate and sodium diacid phosphate:

| Quantity of Chicken Meat Paste | Quantity of Enzyme |
|---|---|
| 100 gms. | 0.1 gms. prolase |
| 100 gms. | 0.1 gms. bromelain |
| 100 gms. | 0.1 gms. papain |
| 100 gms. | 0.1 gms. pilzprotease S |
| 75 gms. | 0.1 gms. rhozyme P 11 |
| 75 gms. | 0.1 gms. bromelin |
| 50 gms. | 0.1 gms. pepsin |
| 50 gms. | 0.1 gms. trypsin |
| 50 gms. | 0.1 gms. J-25 |
| 50 gms. | 0.1 gms. protease 62 |
| 40 gms. | 0.1 gms. HT proteolytic 200 |
| 25 gms. | 0.1 gms. fungal protease |
| 25 gms. | 0.1 gms. prolase MT-7820 |
| 25 gms. | 0.1 gms. molsin |
| 20 gms. | 0.1 gms. mylase |
| 20 gms. | 0.1 gms. bakterien |

Each of the resulting enzymatic chicken digests are used separately in the reaction flavors as set forth in the several examples following.

EXAMPLE V

68 Grams of cysteine hydrochloride, 500 grams of water, 30 grams of enzymatic chicken meat digest according to the process of Example III and 34 grams of thiamine hydrochloride are intimately admixed. The resulting slurry is then heated to reflux and maintained at reflux with stirring for a period of four hours. The resulting slurry is filtered yielding 0.51 kilograms of filtrate. An aliquot of the filtrate is withdrawn and dried. Based on the weight of the dry product obtained, sufficient gum arabic is added to the filtrate to provide a composition containing one part by weight of flavor solids and one part by weight of gum arabic. The composition is then spray-dried to produce a dry product with an intense chicken flavor having a very close resemblance to natural chicken flavor insofar as flavor nuances, mouthfeel and texture are concerned.

EXAMPLE VI

44 Grams of cysteine hydrochloride, 600 grams of water, 70 grams of enzymatic chicken meat digest produced according to the process of Example III and 22 grams of thiamine hydrochloride are intimately admixed. The resulting mixture is then heated at reflux for a period of four hours. To ½ kilogram of the resulting product 2.22 kilograms of a 45% aqueous gum arabic solution is added. The resulting mixture is spray-dried to produce an excellent chicken flavor insofar as flavor nuances, mouthfeel and texture are concerned.

EXAMPLE VII

A chicken noodle soup is prepared by mixing together

| Ingredient | Grams |
| --- | --- |
| Salt | 5.00 |
| The spray dried flavor of Example VI | 6.00 |
| Gelatin (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixtures; and the mix is brought to a full boil, simmered for five minutes, and is then ready to serve.

EXAMPLE VIII 12.75 Grams of cysteine hydrochloride, 800 grams Neobee M-5, 20 grams of enzymatic chicken meat digest according to the process of Example IV and 6.375 grams of thiamine hydrochloride are intimately admixed. The resulting mixture is refluxed for a period of four hours with stirring. 0.8 Kilograms of the resulting flavor is then admixed with 0.356 kilograms of a 45% aqueous gum arabic solution and the resulting mixture is spray-dried yielding 315 grams of a product having a flavor closely resembling natural chicken flavor insofar as flavor nuances, mouthfeel and texture are concerned.

EXAMPLE IX

A chicken noodle soup is prepared by mixing together:

| Ingredient | Grams |
| --- | --- |
| Salt | 5.00 |
| The spray dried flavor of Example VIII | 1.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for five minutes, and is then ready to serve.

EXAMPLE X

Into a pressurized scraped wall "Giusti" reaction vessel the following materials are introduced; 0.704 kilos of cysteine hydrochloride, 0.704 kilos of enzymatic chicken meat digest according to the process of Example III and 0.352 kilos of thiamine hydrochloride. The reaction vessel is operated for a period of 30 minutes at a temperature of 130° C and at a pressure in the range of from 2 up to 3 atmospheres. The reaction mass is then cooled yielding a product having an excellent chicken flavor insofar as flavor nuances, mouthfeel and texture are concerned.

EXAMPLE XI

200 Grams of enzymatic turkey meat digest produced according to the process of Example I, 2000 grams of water, 58.8 grams of cysteine hydrochloride and 29.4 grams of thiamine hydrochloride are intimately admixed. The resulting mixture is refluxed at atmospheric pressure for a period of four hours with stirring. The resulting slurry is then cooled and filtered. 1.4 Kilograms of the filtrate is then intimately admixed with 623 grams of a 45% aqueous gum arabic solution and the resulting mixture is spray-dried. The resulting solid spray-dried material has an excellent natural-like-turkey meat flavor insofar as flavor nuances, mouthfeel and texture are concerned.

EXAMPLE XII

150 Grams of enzymatic chicken meat digest according to the process of Example III, 1000 grams of Neobee M-5, 26.25 grams of cysteine hydrochloride, 13.25 grams of thiamine hydrochloride and 4.4 grams of d-xylose are intimately admixed. The resulting mixture is then refluxed at atmospheric pressure for a period of four hours with stirring. The resulting product has an excellent chicken flavor insofar as flavor nuances, mouthfeel and texture are concerned.

EXAMPLE XIII

The following ingredients are admixed to form a chicken soup concentrate:

| Ingredients | Grams |
| --- | --- |
| Salt | 312 |
| Hydrogenated peanut oil | 260 |
| Monosodium glutamate | 155 |
| Chicken flavor produced by Example XII | 78 |
| Turmeric extract in 10% ethyl alcohol | 5.2 |
| Spices | 26 |
| Hydrolyzed vegetable protein | 156 |
| Dried parsley leaf | 5.2 |

20 Grams of the foregoing concentrate is admixed with 1 liter of water at a temperature of 85° C. The resulting mixture is boiled for a period of three minutes yielding a flavorful chicken soup.

EXAMPLE XIV

300 Grams of enzymatic chicken meat digest according to the process of Example III, 500 grams of water, 68 grams of 2-amino ethane sulfonic acid sodium salt (taurine) and 34 grams of thiamine hydrochloride are intimately admixed. The resulting slurry is then heated to reflux and maintained at reflux with stirring for a period of 4 hours. The resulting slurry is filtered yielding 0.50 kilograms of filtrate. An aliquot of the filtrate is withdrawn and dried. Based on the weight of the dry product obtained, sufficient gum arabic is added to the filtrate to provide a composition containing one part by weight of flavor solid and one part by weight of gum arabic. The composition is then spray-dried to produce a dry product with an intense chicken flavor having a very close resemblance to natural chicken flavor insofar as flavor nuances, mouthfeel and texture are concerned.

EXAMPLE XV

80 Grams of enzymatic chicken meat digest produced according to Example III, 8.8 grams of cysteine hydrochloride, 4.4 grams of thiamine hydrochloride and 1030 grams of water are intimately admixed. The resulting slurry is then heated to reflux at one atmosphere absolute pressure and maintained at reflux with stirring for a period of 4 hours. The resulting slurry is divided into two equal portions; portion A and portion B. Portion A is filtered. An aliquot of the filtrate is withdrawn and dried. Based on the weight of the dry product obtained, sufficient gum arabic is added to the filtrate to provide a composition containing one part by weight of flavor solids and one part by weight of gum arabic. The composition is then spray-dried to produce a dry product with an intense chicken flavor having a very close resemblance to natural chicken flavor (Product A) insofar as flavor nuances, mouthfeel and texture are concerned. Product B (portion B produced supra) also has an intense chicken flavor having a very close resemblance to natural chicken flavor insofar as flavor nuances, mouthfeel and texture are concerned.

EXAMPLE XVI

A chicken noodle soup is prepared by mixing together:

| Ingredient | Gms./Unit |
|---|---|
| Salt | 5.00 |
| Product A produced in Example XV | 6.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XVII

A chicken noodle soup is prepared by mixing together:

| Ingredient | Grams |
|---|---|
| Salt | 5.00 |
| Product B produced in Example XV | 6.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XVIII 0.45 Kilos of enzymatic chicken meat digest produced according to the process of Example III, 1 kilo of Neobee M-5, 128 grams of cysteine hydrochloride and 64 grams of thiamine hydrochloride are intimately admixed. The resulting mixture is refluxed for a period of four hours with stirring. 0.8 Kilograms of the resulting flavor is then admixed with 0.356 kilograms of a 45% aqueous gum arabic solution and the resulting mixture is spray-dried yielding 315 grams of a product having a flavor closely resembling natural chicken flavor insofar as flavor nuances, mouthfeel and texture are concerned.

EXAMPLE XIX

A chicken noodle soup is prepared by mixing together:

| Ingredient | Grams |
|---|---|
| Salt | 5.00 |
| The spray dried flavor of Example XVIII | 1.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XX 0.704 Kilos of cysteine hydrochloride, 0.19 kilos enzymatic chicken meat digest produced according to the process of Example III and 0.352 kilos of thiamine hydrochloride is added to a pressurized scraped wall "Giusti" reaction vessel and the reaction vessel is operated for a period of 30 minutes at a temperature of 130° C and at a pressure in the range of from 2 up to 3 atmospheres. The reaction mass is then cooled yielding a product having an excellent chicken flavor insofar as flavor nuances, mouthfeel and texture are concerned.

EXAMPLE XXI

32 Grams of enzymatic turkey meat digest according to the process of Example I, 1500 grams of water, 8.8 grams of cysteine hydrochloride and 29.4 grams of thiamine hydrochloride are intimately admixed. The resulting mixture is refluxed at atmospheric pressure for a period of four hours with stirring. The resulting slurry is then cooled and filtered. 1.4 Kilograms of the filtrate is then intimately admixed with 623 grams of a 45% aqueous gum arabic solution and the resulting mixture is spray-dried. The resulting solid spray-dried material has an excellent natural-like turkey meat flavor insofar as flavor nuances, mouthfeel and texture are concerned.

EXAMPLE XXII

A turkey noodle soup is prepared by mixing together:

| Ingredient | Grams |
|---|---|
| Salt | 5.00 |
| The spray dried flavor of Example XXI | 1.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture, and the mix is brought to a full boil, simmered for 5 minutes, and is then ready to serve.

EXAMPLE XXIII

150 Grams of enzymatic chicken meat digest according to the process in Example III, 400 grams of water, 26.25 grams of cysteine hydrochloride, 13.25 grams of thiamine hydrochloride and 4.4 grams of d-xylose are intimately admixed. The resulting mixture is then refluxed at atmospheric pressure for a period of four hours with stirring. The resulting product has an excellent intense chicken flavor insofar as flavor nuances, mouthfeel and texture are concerned.

EXAMPLE XXIV

The following ingredients are admixed to form a chicken soup concentrate:

| Ingredients | Grams |
| --- | --- |
| Salt | 312 |
| Hydrogenated peanut oil | 260 |
| Monosodium glutamate | 155 |
| Chicken flavor produced by Example XXIII | 78 |
| Turmeric extract in 10% ethyl alcohol | 5.2 |
| Spices | 26 |
| Hydrolyzed vegetable protein | 156 |
| Dried parsley leaf | 5.2 |

20 Grams of the foregoing concentrate is admixed with 1 liter of water at a temperature of 85° C. The resulting mixture is refluxed for a period of three minutes yielding a flavorful chicken soup.

EXAMPLE XXV

58 Grams of enzymatic chicken meat digest according to the process in Example III, 800 grams of Neobee M-5, 68 grams of 2-amino ethane sulfonic acid sodium salt (taurine) and 34 grams of thiamine hydrochloride are intimately admixed. The resulting slurry is then heated to reflux and maintained at reflux with stirring for a period of four hours. The resulting slurry is filtered yielding 0.51 kilograms of filtrate. An aliquot of the filtrate is withdrawn and dried. Based on the weight of the dry product obtained, sufficient gum arabic is added to the filtrate to provide a composition containing one part by weight of flavor solid and 1 part by weight of gum arabic. The composition is then spray-dried to produce a dry product with an intense chicken flavor having a very close resemblance to natural chicken flavor insofar as flavor nuances, mouthfeel and texture are concerned.

EXAMPLE XXVI

Separately, each of the enzymatic turkey meat digests prepared according to Example II are admixed with 8.8 grams cysteine hydrochloride, 29.4 grams of thiamine hydrochloride and 400 grams of water. Each of the resulting mixtures is refluxed at atmospheric pressure for periods of 4 hours with stirring. Each of the resulting slurries is then cooled and filtered. 250 Grams of each of the filtrates is then admixed with 125 grams of a 45% aqueous gum arabic solution and each of the resulting mixtures is spray-dried. Each of the resulting solid spray-dried materials has an excellent natural turkey meat flavor insofar as flavor nuances, mouthfeel and texture are concerned.

EXAMPLE XXVII

Several separate turkey noodle soup batches are prepared by mixing together:

| Ingredient | Grams |
| --- | --- |
| Salt | 5.00 |
| One of the spray-dried turkey flavors prepared according to the process of Example XXVI | 1.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture, and the mix is brought to a full boil, simmered for 5 minutes, and is then ready to serve.

EXAMPLE XXVIII

Separately, each of the enzymatic chicken meat digests prepared according to Example IV are admixed with 8.8 grams cysteine hydrochloride, 29.4 grams of thiamine hydrochloride and 400 grams of water. Each of the resulting mixtures is refluxed at atmospheric pressure for periods of four hours with stirring. Each of the resulting slurries is then cooled and filtered. 250 Grams of each of the filtrates is then admixed with 125 grams of a 45% aqueous gum arabic solution and each of the resulting mixtures is spray-dried. Each of the resulting solid spray-dried materials has an excellent natural chicken meat flavor insofar as flavor nuances, mouthfeel and texture are concerned.

EXAMPLE XXIX

Several separate chicken noodle soup batches are prepared by mixing together:

| Ingredient | Grams |
| --- | --- |
| Salt | 5.00 |
| One of the spray-dried chicken flavors prepared according to the process of Example XXVIII | 1.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture, and the mix is brought to a full boil, simmered for 5 minutes, and is then ready to serve.

EXAMPLE XXX

Into a 300 ml flask equipped with stirrer, thermometer and heating mantle the following materials are placed:

50 grams — ground raw leg of lamb
100 ml — water
0.20 grams — Mylase enzyme

The pH of the contents of the flasks is adjusted to exactly 5.0 by addition thereto of phosphoric acid. The contents of the flask is prepasteurized for 30 minutes at 60° C. The contents of the flask are then incubated at 50° C using agitation (250 RPM) for a period of 120 hours. The resulting enzymatic lamb digest is used in the reaction flavors as set forth in the several examples following.

EXAMPLE XXXI

32 Grams of enzymatic lamb meat digest according to the process of Example XXX, 1500 grams of water, 8.8 grams of cysteine hydrochloride and 29.4 grams of thiamine hydrochloride are intimately admixed. The resulting mixture is refluxed at atmospheric pressure for a period of four hours with stirring. The resulting slurry is then cooled and filtered. 1.4 Kilograms of the filtrate is then intimately admixed with 623 grams of a 45% aqueous gum arabic solution and the resulting mixture is spray-dried. The resulting solid spray-dried material has an excellent natural-like lamb meat flavor insofar as flavor nuances, mouthfeel and texture are concerned.

EXAMPLE XXXII

Into a 300 ml flask equipped with stirrer, thermometer and heating mantle the following materials are placed:

50 grams — ground raw pork meat
100 ml — water
0.20 grams — Mylase enzyme

The pH of the contents of the flasks is adjusted to exactly 5.0 by addition thereto of phosphoric acid. The contents of the flask is prepasteurized for 30 minutes at 60° C. The contents of the flask are then incubated at 50° C using agitation (250 RPM) for a period of 120 hours. The resulting enzymatic pork digest is used in the reaction flavors as set forth in the several examples following.

EXAMPLE XXXIII

32 Grams of enzymatic pork meat digest according to the process of Example XXXII, 1500 grams of water, 8.8 grams of cysteine hydrochloride and 29.4 grams of thiamine hydrochloride are intimately admixed. The resulting mixture is refluxed at atmospheric pressure for a period of four hours with stirring. The resulting slurry is then cooled and flitered. 1.4 Kilograms of the filtrate is then intimately admixed with 623 grams of a 45% aqueous gum arabic solution and the resulting mixture is spray-dried. The resulting solid spray-dried material has an excellent natural-like pork meat flavor insofar as flavor nuances, mouthfeel and texture are concerned.

EXAMPLE XXXIV

Into a 300 ml flask equipped with stirrer, thermometer and heating mantle the following materials are placed:

50 grams — ground raw beef burger meat (ground chuck)
100 ml — water
0.20 grams — Mylase enzyme The pH of the contents of the flasks is adjusted to exactly 5.0 by addition thereto of phosphoric acid. The contents of the flask is prepasteurized for 30 minutes at 60° C. The contents of the flask are then incubated at 50° C using agitation (250 RPM) for a period of 120 hours. The resulting enzymatic beef digest is used in the reaction flavors as set forth in the several examples following.

EXAMPLE XXXV

32 Grams of enzymatic beef meat digest according to the process of Example XXIV, 1500 grams of water, 8.8 grams of cysteine hydrochloride and 29.4 grams of thiamine hydrochloride are intimately admixed. The resulting mixture is refluxed at atmospheric pressure for a period of 4 hours with stirring. The resulting slurry is then cooled and filtered. 1.4 Kilograms of the filtrate is then intimately admixed with 623 grams of a 45% aqueous gum arabic solution and the resulting mixture is spray-dried. The resulting solid spray-dried material has an excellent natural-like beef meat flavor insofar as flavor nuances, mouthfeel and texture are concerned.

EXAMPLE XXXVI 0.45 Kilos of enzymatic chicken meat digest produced according to the process of Example III, 1 kilo of Neobee-M-5 and 128 grams of cysteine hydrochloride are intimately admixed. The resulting mixture is refluxed for a period of four hours with stirring. 0.8 Kilograms of the resulting flavor is then admixed with 0.356 kilograms of a 45% aqueous gum arabic solution and the resulting mixture is spray-dried yielding 315 grams of a product having a flavor closely resembling natural chicken flavor insofar as flavor nuances, mouthfeel and texture are concerned.

EXAMPLE XXXVII

A chicken noodle soup is prepared by mixing together:

| Ingredient | Grams |
|---|---|
| Salt | 5.00 |
| The spray dried flavor of Example XVIII | 1.00 |
| Gelatine (180 bloom) | 1.00 |
| Monosodium glutamate | .40 |
| Caramel color | .40 |
| Garlic powder | .10 |
| White pepper, ground | .06 |
| Mixed vegetable pieces | 36.00 |

Three cups of water are added to the above mixture; and the mix is brought to a full boil, simmered for 5 minutes, and is then ready to serve.

EXAMPLE XXXVIII 0.704 Kilos of cysteine hydrochloride and 0.19 kilos enzymatic chicken meat digest produced according to the process of Example III is added to a pressurized scraped wall "Giusti" reaction vessel and the reaction vessel is operated for a period of 30 minutes at a temperature of 130° C and at a pressure in the range of from 2 up to 3 atmospheres. The reaction mass is then cooled yielding a product having an excellent chicken flavor insofar as flavor nuances, mouthfeel and texture are concerned.

EXAMPLE XXXIX

Comparison of products of instant case with those of:
(1) U.S. Pat. Application No. 334,894 filed on Feb. 22, 1973
(2) U.S. Pat. No. 2,934,437 issued Apr. 26, 1960 and
(3) U.S. Pat. No. 3,394,015 issued July 23, 1968

Example (A)

Into a 300 ml flask equipped with stirrer, thermometer and heating mantle, the following materials are placed:

50 grams — Ground raw chicken meat
100 ml — water
2.5 grams — Mylase enzyme

The pH of the contents of the flasks is adjusted to exactly 5.0 by addition thereto of phosphoric acid. The contents of the flask is prepasteurized for 30 minutes at 60° C. The contents of the flask are then incubated at 50° C using agitation (250 RPM) for a period of 120 hours. The resulting enzymatic chicken digest is used in the reaction flavors as set forth in the several examples following.

Example (B)

2.2 Kilograms of chicken egg white powder, dissolved in 6.5 kilograms of water is intimately admixed with 8.8 grams of papain for a period of 2 hours at a temperature of 65° C under agitation. The resulting enzymatic digest is then intimately admixed with 68 grams of cysteine hydrochloride, 30 grams of enzymatic chicken meat digest according to the process of Example (A) and 34 grams of thiamine hydrochloride. The resulting slurry is then heated to reflux and maintained at reflux with stirring for a period of 4 hours. The resulting slurry is filtered yielding 5.1 kilograms of filtrate. An aliquot of the filtrate is withdrawn and dried. Based on the weight of the dry product obtained, sufficient gum arabic is added to the filtrate to provide a composition containing one part by weight of flavor solids and one part by weight of gum arabic. The composition is then spray-dried to produce a dry flavor.

Example (C)

1.5 Kilograms of chicken egg yolk powder is dissolved in 5.15 kilograms of water and the resulting solution is admixed with 7.5 grams papain for a period of 2 hours at a temperature of 65° C with stirring. At the end of the two-hour period, the resulting enzymatic digest is intimately admixed with 44 grams of cysteine hydrochloride, 70 grams of enzymatic chicken meat digest according to the process of Example (A). The resulting mixture is then heated at reflux for a period of 4 hours. To 5 kilograms of the resulting product 2.22 kilograms of a 45% aqueous gum arabic solution is added. The resulting mixture is spray-dried to produce chicken flavor.

Example (D)

0.085 Kilograms of the contents of whole fresh chicken eggs are intimately admixed with 12.75 grams of cysteine hydrochloride, 20 grams of enzymatic chicken meat digest according to the the process of Example (A) and 6.375 grams of thiamine hydrochloride. The resulting mixture is refluxed for a period of 4 hours with stirring. 0.8 Kilograms of the resulting flavor is then admixed with 0.356 kilograms of a 45% aqueous gum arabic solution and the resulting mixture is spray-dried yielding 315 grams of a product having a chicken flavor.

Example (E)

12 Kilograms of chicken egg yolk powder, 41.2 kilograms of water, 0.704 kilograms of cysteine hydrochloride and 0.704 kilos of enzymatic chicken meat digest prepared according to the process of Example (A) are introduced into a scraped "Giusti" reaction vessel. The reaction vessel is operated for a period of 30 minutes at a temperature of 130° C and at a pressure in the range of from 2 up to 3 atmospheres. The reaction mass is then cooled yielding a product having a chicken flavor.

Example (F) — (Example 5 of U.S. Pat. No. 2,934,437)

Commercially available charcoal-treated hydrolyzed (casein plus groundnut protein) powder (4 g.) and L-cysteine (2 g.) and D-glucose (1 g.) and D-xylose (1 g.) and water (100 g.) in a vessel fitted with a reflux condenser were heated to boiling for 3 hours. After cooling the product to room temperature, it was brought to pH-6.7 by addition of alkali. The brown-colored solution had an aroma and taste resembling cooked meat.

Example (G) — (Example 1 of U.S. Pat. No. 3,394,015)

The following ingredients were refluxed for 4 hours. The resulting mixture was then aged for three days and an aliquot withdrawn and dried. Based on the weight of the dry solid product obtained, sufficient gum arabic was added to the batch to provide a composition containing 1 part by weight of flavor solids and one part by weight of gum arabic. The composition was spray-dried to produce a beef flavored product.

| | |
|---|---|
| L-cysteine hydrochloride | .88 |
| Carbohydrate free vegetable protein acid hydrolysate | 30.94 |
| Thiamine hydrochloride | .88 |
| Water | 67.30 |

Each of the products produced according to Examples (B)–(G) is compared in side-by-side blind panel comparisons with the products produced according to Example V, X, XXIII and XXXVI of the instant application. The products produced according to the processes of Examples, V, X, XXIII and XXXVI all having flavors and aromas closely resembling natural chicken flavor insofar as flavor nuances, mouthfeel and texture are concerned, have flavor properties unexpectly different in kind from the flavor properties of the products produced according to the processes of Examples (B), (C), (D), (E), (F) and (G).

EXAMPLE XL

Comparison of products of instant case with products covered by:

(1) U.S. Pat. Application No. 334,894 filed on Feb. 22, 1973
(2) U.S. Pat. No. 2,934,437 issued Apr. 26, 1960 and
(3) U.S. Pat. No. 3,394,015 issued July 23, 1968

Example A'

Into a 3 liter round bottom flask equipped with stirrer, thermometer and heating mantle, the following materials are placed:

500 grams — ground raw chicken meat
850 ml — deionized water
1.5 grams — papain enzyme The pH of the contents of the flasks is adjusted to exactly 5.4 by addition thereto of 150 grams of pH = 4.6 sodium citrate phosphate buffer solution. The contents of the flask is prepasteurized for 30 minutes. The contents of the flask are then incubated at 65° C using agitation (250 RPM) for a period of 120 hours. The resulting enzymatic chicken digest is used in the reaction flavors as set forth in the several examples following.

Example B'

0.085 Kilograms of the contents of whole fresh chicken eggs are admixed with 1.7 grams of papain with stirring for a period of 2 hours at a temperature of 65° C. 50 Grams of the resulting enzymatic egg digest are then admixed with 30 grams of enzymatic chicken meat digest produced according to the process of Example A', 1.5 grams of L-cysteine hydrochloride, 0.7 grams of thiamine hydrochloride and 18 ml of deionized water. The resulting mixture is refluxed for a period of 4 hours with stirring.

Example C'

50 Grams of the enzymatic egg digest produced according to the process of Example B' are admixed with 30 grams of enzymatic chicken meat digest produced according to the process of Example A', 1.5 grams of L-cysteine hydrochloride and 18.7 ml of deionized water. The resulting mixture is refluxed for a period of 4 hours with stirring.

Example D'

50 Grams of whole fresh chicken eggs are admixed with 50 grams of enzymatic chicken meat digest produced according to the process of Example A', 1.5 grams of L-cysteine hydrochloride and 18.7 ml deionized water. The resulting mixture is refluxed for a period of 4 hours with stirring.

Example E'

50 Grams of whole fresh chicken eggs are admixed with 30 grams of enzymatic chicken meat digest produced according to the process of Example A', 1.5 grams of L-cysteine hydrochloride, 0.7 grams of thiamine hydrochloride and 18 ml of deionized water. The resulting mixture is refluxed for a period of 4 hours with stirring.

Example F'

30 Grams of enzymatic chicken meat digest produced according to the process of Example A' are admixed with 1.5 grams of L-cysteine hydrochloride and 68.7 ml of deionized water. The resulting mixture is refluxed for a period of 4 hours with stirring.

Example G'

30 Grams of enzymatic chicken meat digest produced according to the process of Example A' are admixed with 1.5 grams of L-cysteine hydrochloride, 0.7 grams of thiamine hydrochloride and 68 ml of deionized water. The resulting mixture is refluxed for a period of 4 hours with stirring.

Example H'

500 Grams of chicken meat (water contents: 80% by weight) is admixed with 300 ml of deionized water and 700 grams of concentrated hydrochloric acid. The final hydrochloric acid concentration is 6N. The resulting mixture is refluxed at atmospheric pressure for 12 hours, then cooled to room temperature and filtered through glass fiber filter paper. The resulting filtrate is evaporated to 50% of its original volume, cooled to room temperature and neutralized to a pH of 5.5 with 8N sodium hydroxide.

Example I'

30 Grams of acid hydrolyzed chicken meat produced according to Example H' is admixed with 1.5 grams of L-cysteine hydrochloride and 68.7 grams of deionized water. The resulting mixture is refluxed for a period of 4 hours with stirring.

Example J'

30 Grams of acid hydrolyzed chicken meat produced according to Example H' is admixed with 1.5 grams of L-cysteine hydrochloride, 0.7 grams of thiamine hydrochloride and 68 ml of deionized water. The resulting mixture is refluxed for a period of 4 hours with stirring.

Each of the products produced according to Examples B', C', D', E', I' and J' is compared in side-by-side blind panel comparisons with the products produced according to Examples F' and G' which are encompassed by the instant patent application. The products produced according to the processes of Examples F' and G' all have flavors and aromas closely resembling natural chicken flavor insofar as flavor nuances, mouthfeel and texture are concerned, have flavor properties unexpectly different in kind from the flavor properties of the products produced according to the processes of Examples B', C', D', E', I' and J'.

What is claimed is:

1. A process for altering the meat flavor of a foodstuff comprising adding to said foodstuff at least 0.2% by weight of a flavor imparting product produced by a process comprising (A) intimately admixing in the absence of any natural meat or poultry meat products other than an enzymatic digest of meat, a composition consisting essentially of (i) an enzymatic digest of meat produced by admixing from 0.1 up to 0.4% enzyme with meat at a pH of from 3 up to 6, at a temperature of from 40° up to 75° C for a period of from 10 hrs. up to 150 hrs., selected from the group consisting of mylase digest of turkey meat; mylase digest of chicken meat; mylase digest of beef; mylase digest of lamb meat and mylase digest of pork, (ii) L-cysteine hydrochloride and (iii) thiamine hydrochloride; said enzymatic digest of meat, said L-cysteine hydrochloride and said thiamine hydrochloride each being present in an amount sufficient to produce an intense meat flavor, the weight percent of cysteine based on enzymatic meat digest being from 2 up to 5%, the ratio of thiamine hydrochloride; cysteine hydrochloride being in the range of from 0.25:1 up to 1:1 (B) heating the resulting mixture at a temperature of from 100° up to 350° C, a pressure of from 1–10 atmospheres and for a period of time of from 0.2 up to 10 hrs. whereby a meat flavored product is produced; and (C) adding gum arabic to the meat flavor and spray drying the resulting mixture, the weight ratio of gum arabic to said meat flavor being from 0.2:1 up to 2:1 based on the solids content of the mixture prior to spray drying.

* * * * *